US008051662B2

(12) United States Patent
Figueroa et al.

(10) Patent No.: US 8,051,662 B2

(45) Date of Patent: Nov. 8, 2011

(54) TRANSITION DUCT ASSEMBLIES AND GAS TURBINE ENGINE SYSTEMS INVOLVING SUCH ASSEMBLIES

(75) Inventors: Carlos G. Figueroa, Wellington, FL (US); Craig F. Smith, Ashford, CT (US)

(73) Assignee: United Technologies Corp., Hartford, CT (US)

( * ) Notice: Subject to any disclaimer, the term of this patent is extended or adjusted under 35 U.S.C. 154(b) by 548 days.

(21) Appl. No.: 12/368,403

(22) Filed: Feb. 10, 2009

(65) Prior Publication Data

US 2010/0199677 A1 Aug. 12, 2010

(51) Int. Cl.

*F02C 1/00* (2006.01)

*F02G 3/00* (2006.01)

(52) U.S. Cl. ................ 60/752; 60/753; 60/754; 60/755; 60/756; 60/757; 60/758; 60/759; 60/760

(58) Field of Classification Search ............. 60/752–760

See application file for complete search history.

(56) References Cited

U.S. PATENT DOCUMENTS

| | | | |
|---|---|---|---|
| 4,016,718 A | 4/1977 | Lauck | |
| 4,512,159 A | 4/1985 | Memmen | |
| 4,719,748 A * | 1/1988 | Davis et al. | 60/39.37 |
| 4,747,750 A | 5/1988 | Chlus et al. | |
| 5,414,999 A | 5/1995 | Barnes | |
| 6,199,371 B1 | 3/2001 | Brewer et al. | |
| 6,494,044 B1 | 12/2002 | Bland | |
| 6,644,032 B1 | 11/2003 | Jorgensen et al. | |
| 7,010,921 B2 | 3/2006 | Intile et al. | |
| 7,137,241 B2 | 11/2006 | Martling et al. | |
| 7,310,938 B2 | 12/2007 | Marcum et al. | |
| 2009/0145099 A1* | 6/2009 | Jennings et al. | 60/39.37 |
| 2009/0249791 A1* | 10/2009 | Belsom | 60/755 |

* cited by examiner

*Primary Examiner* — William Rodriguez

*Assistant Examiner* — Craig Kim

(57) ABSTRACT

Transition duct assemblies and gas turbine engine systems involving such assemblies are provided. In this regard, a representative a transition duct assembly for a gas turbine engine includes: an impingement sheet having cooling holes formed therethrough, an inlet end and a non-flanged outlet end, the impingement sheet being operative to be positioned about an exterior of a transition duct such that cooling air is directed to flow about the transition duct; the non-flanged outlet end of the impingement sheet being operative to attach the impingement sheet to the transition duct such that the inlet end is positioned adjacent to an intake end of the transition duct and the outlet end is positioned adjacent to an exhaust end of the transition duct.

20 Claims, 4 Drawing Sheets

TRANSITION DUCT ASSEMBLIES AND GAS TURBINE ENGINE SYSTEMS INVOLVING SUCH ASSEMBLIES

BACKGROUND

1. Technical Field

The disclosure generally relates to gas turbine engines.

2. Description of the Related Art

Gas turbine engines that are primarily used for the generation of electricity are oftentimes referred to as industrial gas turbine engines. Typically, engines of this type are land based and incorporate components that are rather robust, large and heavy. No exception to these characteristics is a common transition duct, which is used to interconnect various flow components of a combustion section with downstream turbine section components.

SUMMARY

Transition duct assemblies and gas turbine engine systems involving such assemblies are provided. In this regard, an exemplary embodiment of a transition duct assembly for a gas turbine engine comprises: an impingement sheet having cooling holes formed therethrough, an inlet end and a non-flanged outlet end, the impingement sheet being operative to be positioned about an exterior of a transition duct such that cooling air is directed to flow about the transition duct; the non-flanged outlet end of the impingement sheet being operative to attach the impingement sheet to the transition duct such that the inlet end is positioned adjacent to an intake end of the transition duct and the outlet end is positioned adjacent to an exhaust end of the transition duct.

An exemplary embodiment of a transition duct assembly for a gas turbine engine comprises: a transition duct having a hollow body and a flange, the body extending between an intake end and an exhaust end, the flange extending from an exterior of the body, the flange having a proximal end and a distal end, the proximal end being attached to the exterior of the body, the distal end of the flange extending toward the intake end; and an impingement sheet having an inlet end and a non-flanged outlet end, the non-flanged outlet end of the impingement sheet being operative to mount to the flange and about the exterior of the transition duct such that the inlet end is positioned adjacent to the intake end of the transition duct and the outlet end is positioned adjacent to the exhaust end of the transition duct, the impingement sheet having cooling holes formed therethrough, the cooling holes being operative to facilitate cooling of the transition duct.

An exemplary embodiment of a gas turbine engine comprises: a combustion section having a combustion liner and a transition duct assembly positioned downstream of the combustion liner; the transition duct assembly having a transition duct and an impingement sheet; the transition duct having a hollow body and a flange, the body extending between an intake end and an exhaust end, the exhaust end exhibiting a smaller cross-sectional flow area than a cross-sectional flow area of the intake end, the flange extending from an exterior of the body, the flange having a proximal end and a distal end, the proximal end being attached to the exterior of the body adjacent to the exhaust end, the distal end of the flange extending toward the intake end, the distal end of the flange being operative to attach the impingement sheet at a non-flanged end of the impingement sheet.

Other systems, methods, features and/or advantages of this disclosure will be or may become apparent to one with skill in the art upon examination of the following drawings and detailed description. It is intended that all such additional systems, methods, features and/or advantages be included within this description and be within the scope of the present disclosure.

BRIEF DESCRIPTION OF THE DRAWINGS

Many aspects of the disclosure can be better understood with reference to the following drawings. The components in the drawings are not necessarily to scale. Moreover, in the drawings, like reference numerals designate corresponding parts throughout the several views.

DETAILED DESCRIPTION

Transition duct assemblies and gas turbine engine systems involving such assemblies are provided, several exemplary embodiments of which will be described in detail. In this regard, some embodiments potentially alleviate some of the perceived assembly difficulty associated with attaching an impingement sheet to a transition duct of an industrial gas turbine engine. Notably, such an impingement sheet is used to facilitate cooling of the transition duct and oftentimes is conventionally secured to the transition duct by a relatively complex flange assembly, which mates with a corresponding picture frame protrusion located at the exhaust end of the transition duct. In some embodiments, a flange is provided that extends from the exhaust end toward the intake end of the transition duct, and to which a non-flanged outlet end of the impingement sheet is attached.

Figure 1:
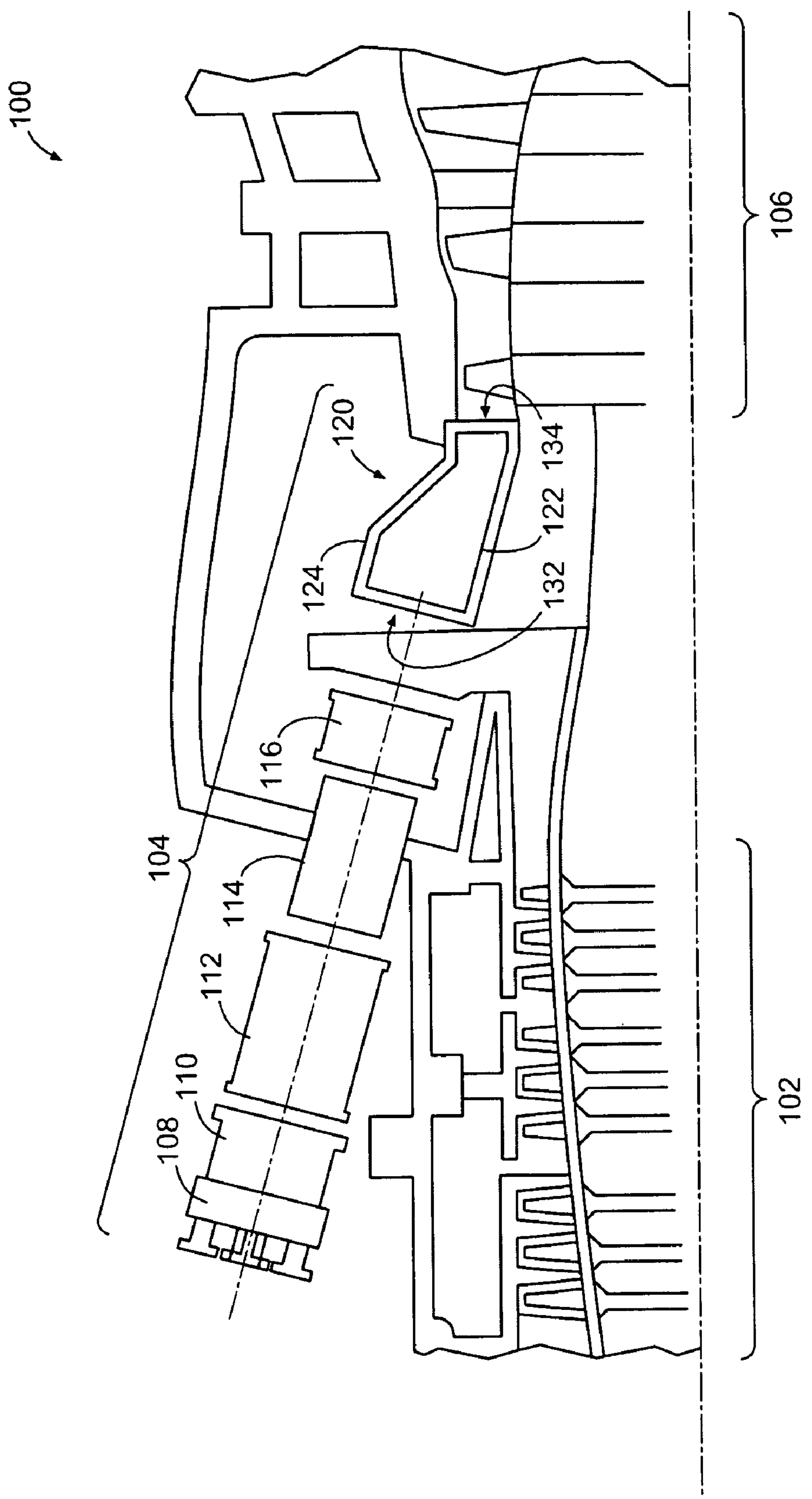
FIG. 1 is a schematic diagram depicting an exemplary embodiment of a gas turbine engine.

Referring now in more detail to the drawings, FIG. 1 is a schematic diagram depicting an exemplary embodiment of a gas turbine engine. As shown in FIG. 1, engine 100 is an industrial gas turbine that incorporates a compressor section 102, a combustion section 104 and a turbine section 106. Notably, various components of the combustion section are presented in an exploded view in FIG. 1. This includes a cap assembly 108, a forward combustion case 110, a flow sleeve 112, a combustion liner 114, an aft combustion case 116, and a transition duct assembly 120. Specifically, transition duct assembly 120 includes a transition duct 122 and an impingement sheet 124.

Figure 2:
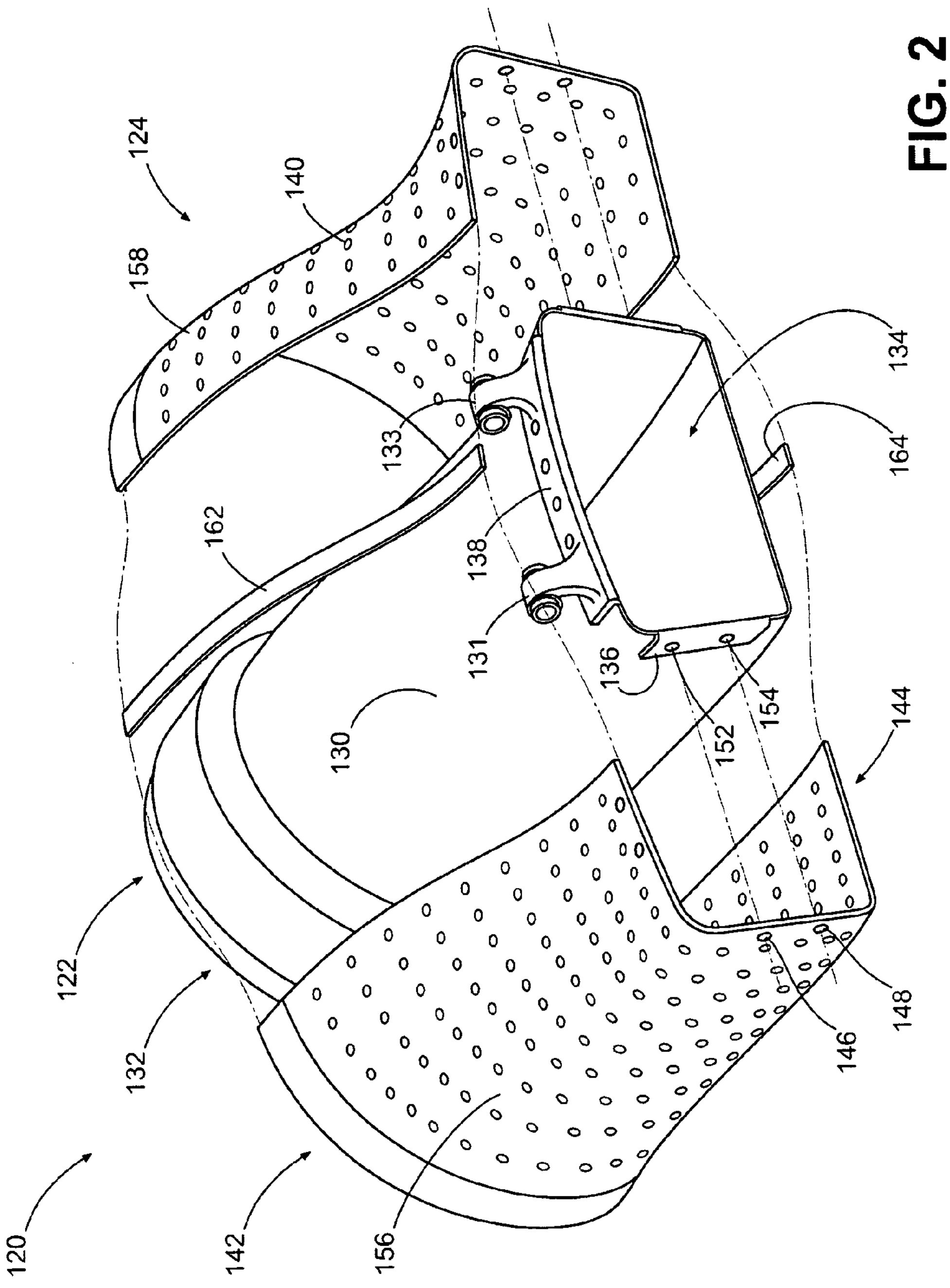
FIG. 2 is a schematic diagram depicting an exemplary embodiment of a transition duct assembly.

As shown in greater detail in the schematic diagram of FIG. 2, transition duct 122 includes a hollow body 130 that extends between an intake end 132 and an exhaust end 134, with the exhaust end in this embodiment exhibiting a smaller cross-sectional flow area than a cross-sectional flow area of the intake end. Multiple flanges (e.g., flanges 136, 138) extend from the exterior of the body. Generally, the flanges extend upstream toward the intake end 132. The transition duct also includes lugs 131, 133, and one or more grooves 182 (see FIGS. 3 and 4). Referring to FIG. 4, each groove 182 is located on the exterior of the hollow body 130, and is positioned between a respective flange (e.g., flange 138) and the exhaust end 134.

Referring again to FIG. 2, impingement sheet 124 is configured to engage about body 130 of the transition duct. Notably, the impingement sheet incorporates cooling holes (e.g., hole 140) that permit air to flow through the impingement sheet and about the transition duct.

The impingement sheet includes an inlet end 142 and an outlet end 144 and mounts to the transition duct so that inlet end 142 is positioned adjacent to intake end 132 and outlet 144 is positioned adjacent to exhaust end 134. In this embodiment, outlet end 144 (which is exhibits a non-flanged edge) attaches to the flanges located at exhaust end 134 of the transition duct. By way of example, attachment holes 146, 148 of the impingement sheet align with attachment holes 152, 154 of flange 136 to facilitate receipt of mechanical fasteners (e.g., bolts, rivets, pin or blind stem, collar type, threaded rod and lock type, etc.), which are not shown in FIG. 2.

As shown in FIG. 2, impingement sheet 124 is formed of portions 156, 158 (in this case, longitudinally segmented halves). Attachments strip 162, 164 engage between the portions 156, 158 along longitudinal seams formed between the portions when the portions and attachment strips are in an assembled configuration.

Figure 3:
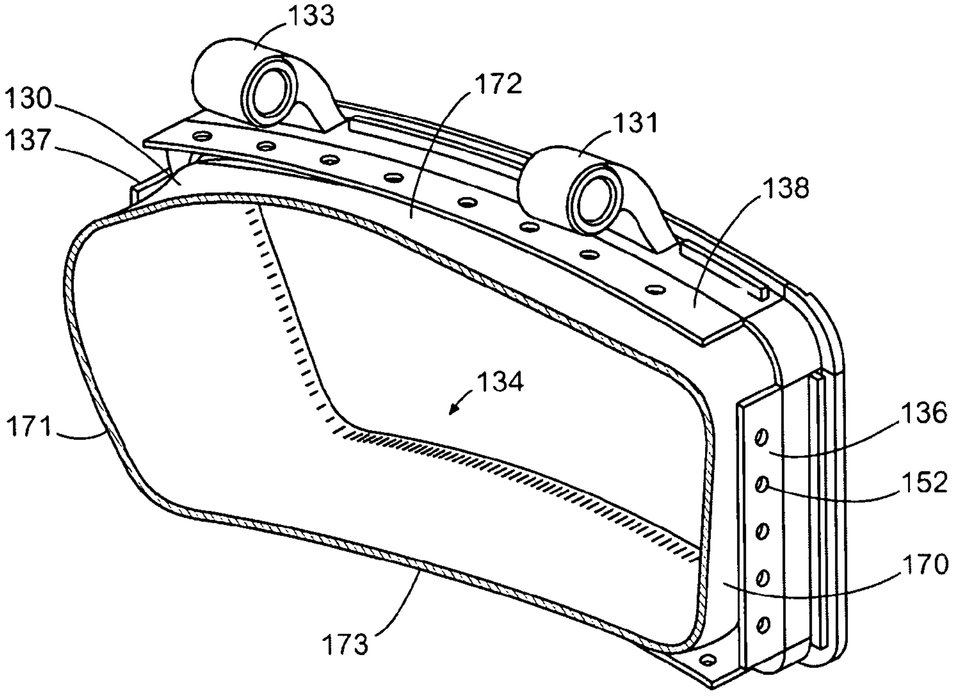
FIG. 3 is a cut-away view of the embodiment of the transition duct of FIG. 2.
Figure 4:
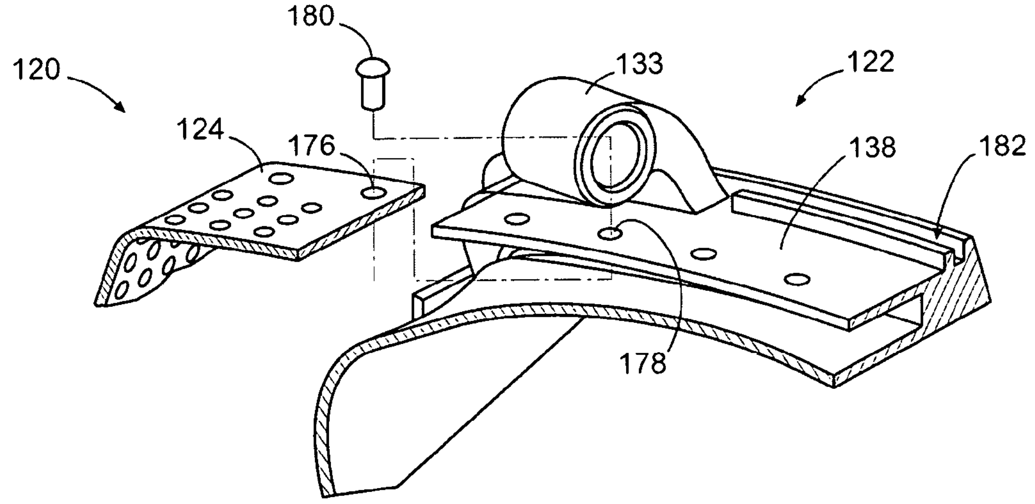
FIG. 4 is a schematic diagram depicting the embodiment of FIG. 3, showing assembly detail of a portion of the impingement sheet and the transition duct.

FIG. 3 is a cut-away view of the embodiment of the transition duct of FIG. 2. As shown in FIG. 3, portions of flanges 136, 137, 138 and 139 are visible. In particular, flanges 136 and 137 extend from opposing circumferential sides 170, 171 of body 130, whereas flanges 138, 139 extend from opposing radial sides 172, 173 of the body. notably, flanges 136, 137 are planar in shape, whereas flanges 138, 139 are arcuate. In other embodiments, various other shapes can be used.

It should also be noted that, in the embodiment of FIG. 3, attachment holes (e.g., hole 152) are provided to facilitate attachment of the flange to a corresponding portion of an impingement sheet. However, in other embodiments, such holes need not be provided. For instance, attachment may be facilitated in other embodiments by welding.

FIG. 4 is a schematic diagram depicting the embodiment of FIG. 3, showing assembly detail of a portion of impingement sheet 124 to transition duct 122. As shown in FIG. 4, a mechanical fastener (in this case, a rivet) is used to secure impingement sheet 124 to transition duct 122. Specifically, holes 176, 178 are aligned with each other and rivet 180 is secured within the holes to facilitate the attachment.

Figure 5:
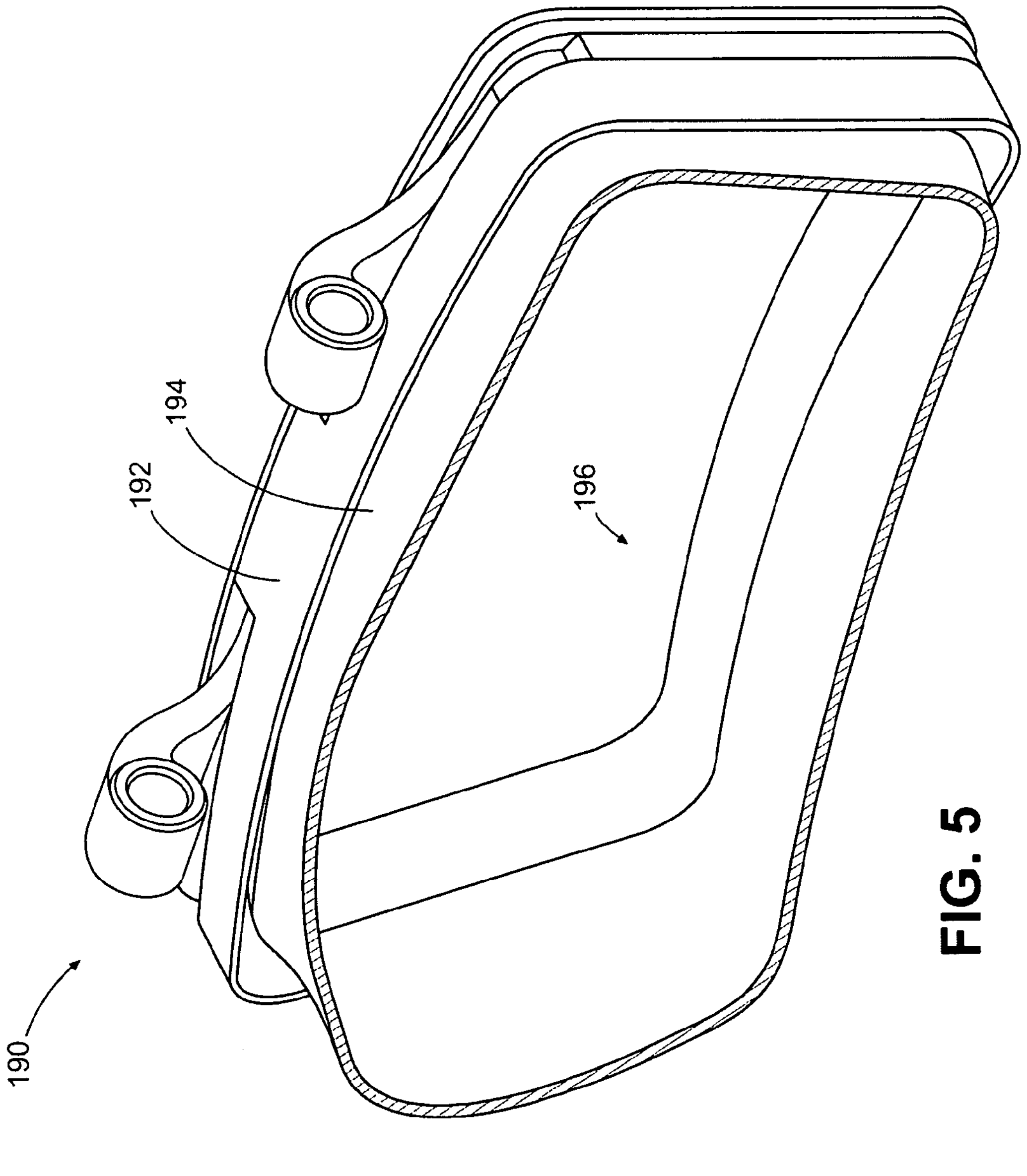
FIG. 5 is a schematic diagram depicting a portion of another exemplary embodiment of a transition duct assembly.

FIG. 5 is a schematic diagram depicting a portion of another exemplary embodiment of a transition duct assembly. In particular, FIG. 5 depicts a portion of a transition duct 190 that includes a continuous flange 192 extending circumferentially about a body 194 of the transition duct. In this embodiment, flange 192 extends from body 194 at a location adjacent to exhaust end 196 of the transition duct. Attachment of an impingement sheet to the transition duct is facilitated by affixing the impingement sheet (not shown) to flange 192.

It should be emphasized that the above-described embodiments are merely possible examples of implementations set forth for a clear understanding of the principles of this disclosure. Many variations and modifications may be made to the above-described embodiments without departing substantially from the spirit and principles of the disclosure. All such modifications and variations are intended to be included herein within the scope of this disclosure and protected by the accompanying claims.

The invention claimed is:

1. A transition duct assembly for a gas turbine engine comprising:

a transition duct having a hollow body and a flange, the body extending between an intake end and an exhaust end, the flange extending from an exterior of the body, the flange having a proximal end and a distal end, the proximal end being attached to the exterior of the body, the distal end of the flange extending toward the intake end; and an impingement sheet having an inlet end and a non-flanged outlet end, the non-flanged outlet end of the impingement sheet being operative to mount to the flange and about the exterior of the transition duct such that the inlet end is positioned adjacent to the intake end of the transition duct and the outlet end is positioned adjacent to the exhaust end of the transition duct, the impingement sheet having cooling holes formed therethrough, the cooling holes being operative to facilitate cooling of the transition duct; wherein the non-flanged outlet end does not extend in a radial direction.

2. The assembly of claim 1, wherein the impingement sheet is operative to attach to the flange at portions of the flange extending toward the intake end of the body.

3. The assembly of claim 1, wherein the flange is a continuous flange extending circumferentially about the body.

4. The assembly of claim 1, wherein:

the flange is a first flange;

the assembly further comprises a second flange; and the first flange and the second flange are located on opposing portions of the body.

5. The assembly of claim 1, further comprising a groove located on the exterior of the body and positioned between the flange and the exhaust end.

6. The assembly of claim 1, wherein:

the flange and the impingement sheet have corresponding attachment holes; and the assembly further comprises mechanical fasteners;

the mechanical fasteners are operative to engage corresponding ones of the attachment holes such that the impingement sheet is attached to the transition duct at locations adjacent to the exhaust end of the transition duct.

7. The assembly of claim 6, wherein the mechanical fasteners are rivets.

8. The assembly of claim 1, wherein the impingement sheet comprises a first portion and a second portion, the first portion and the second portion being joinable along a first longitudinal seam and a second longitudinal seam to form the impingement sheet.

9. The assembly of claim 8, wherein:

the impingement sheet further comprises a first attachment strip and a second attachment strip;

in an assembled configuration, the first attachment strip is located along the first longitudinal seam between the first portion and the second portion of the impingement sheet, and the second attachment strip is located along the second longitudinal seam between the first portion and the second portion of the impingement sheet.

10. A transition duct assembly for a gas turbine engine comprising:

an impingement sheet having cooling holes formed therethrough, an inlet end and a non-flanged outlet end, the impingement sheet being operative to be positioned about an exterior of a transition duct such that cooling air is directed to flow about the transition duct;

the non-flanged outlet end of the impingement sheet being operative to attach the impingement sheet to the transition duct such that the inlet end is positioned adjacent to an intake end of the transition duct and the outlet end is positioned adjacent to an exhaust end of the transition duct; wherein the non-flanged outlet end does not extend in a radial direction.

11. The assembly of claim 10, further comprising the transition duct.

12. The assembly of claim 11, wherein:

the transition duct has a hollow body and a flange;

the hollow body extends between an intake end and an exhaust end, the exhaust end exhibiting a smaller cross-sectional flow area than a cross-sectional flow area of the intake end; and the flange extends from an exterior of the body, the flange having a proximal end and a distal end, the proximal end being attached to the exterior of the body adjacent to the exhaust end, the distal end of the flange extending toward the intake end, the distal end of the flange being operative to attach the impingement sheet.

13. The assembly of claim 12, wherein:

the flange is a first flange;

the duct further comprises a second flange; and the first flange and the second flange are located on opposing portions of the body.

14. The assembly of claim 13, wherein the first flange and the second flange extend from opposing circumferential sides of the body.

15. The assembly of claim 13, wherein the first flange is planar.

16. The assembly of claim 13, wherein the first flange and the second flange extend from opposing radial sides of the body.

17. The assembly of claim 13, first flange is arcuate.

18. A gas turbine engine comprising:

a combustion section having a combustion liner and a transition duct assembly positioned downstream of the combustion liner;

the transition duct assembly having a transition duct and an impingement sheet;

the transition duct having a hollow body and a flange, the body extending between an intake end and an exhaust end, the exhaust end exhibiting a smaller cross-sectional flow area than a cross-sectional flow area of the intake end, the flange extending from an exterior of the body, the flange having a proximal end and a distal end, the proximal end being attached to the exterior of the body adjacent to the exhaust end, the distal end of the flange extending toward the intake end, the distal end of the flange being operative to attach the impingement sheet at a non-flanged end of the impingement sheet; wherein the non-flanged outlet end does not extend in a radial direction.

19. The engine of claim 18, wherein the impingement sheet is operative to attach to the flange at portions of the flange extending toward the intake end of the body.

20. The engine of claim 18, wherein the impingement sheet has an inlet end and an outlet end, the impingement sheet being operative to mount to the flange and about the exterior of the transition duct such that the inlet end is positioned adjacent to the intake end of the transition duct and the outlet is positioned adjacent to the exhaust end of the transition duct, the impingement sheet having cooling holes formed therethrough, the cooling holes being operative to facilitate cooling of the transition duct.

* * * * *